US 6,803,919 B1

(12) United States Patent
Kim et al.

(10) Patent No.: US 6,803,919 B1
(45) Date of Patent: Oct. 12, 2004

(54) EXTRACTING TEXTURE FEATURE VALUES OF AN IMAGE AS TEXTURE DESCRIPTOR IN A TEXTURE DESCRIPTION METHOD AND A TEXTURE-BASED RETRIEVAL METHOD IN FREQUENCY DOMAIN

(75) Inventors: Munchurl Kim, Taejon (KR); Jin Woong Kim, Taejon (KR); Yong Man Ro, Taejon (KR); Ki Won You, Seoul (KR)

(73) Assignee: Electronics and Telecommunications Research Institute, Taejon (KR)

( * ) Notice: Subject to any disclaimer, the term of this patent is extended or adjusted under 35 U.S.C. 154(b) by 356 days.

(21) Appl. No.: 09/611,588

(22) Filed: Jul. 7, 2000

(30) Foreign Application Priority Data

Jul. 9, 1999 (KR) ......................................... 1999-27805
Sep. 28, 1999 (KR) ......................................... 1999-41574

(51) Int. Cl.$^7$ ............................. G09G 5/00; G06K 9/54
(52) U.S. Cl. ......................................... 345/582; 382/305
(58) Field of Search ......................... 345/430, 582–589, 345/419; 382/305, 157

(56) References Cited

U.S. PATENT DOCUMENTS

| 3,993,976 | A | * | 11/1976 | Ginsburg | 382/211 |
| 4,615,013 | A | | 9/1986 | Yan et al. | 364/521 |
| 4,677,576 | A | * | 6/1987 | Berlin et al. | 345/420 |
| 4,884,225 | A | * | 11/1989 | Fogarty et al. | 382/133 |
| 5,161,204 | A | * | 11/1992 | Hutcheson et al. | 382/157 |
| 5,867,609 | A | * | 2/1999 | Shamoon et al. | 382/278 |
| 6,002,738 | A | * | 12/1999 | Cabral et al. | 378/4 |
| 6,151,378 | A | * | 11/2000 | Rasche et al. | 378/4 |
| 6,195,459 | B1 | * | 2/2001 | Zhu | 382/176 |
| 6,363,161 | B2 | * | 3/2002 | Laumeyer et al. | 382/104 |

FOREIGN PATENT DOCUMENTS

| JP | 07-121699 | 5/1995 |
| JP | 09-251554 | 9/1997 |
| WO | WO 00/46750 | 8/2000 |

OTHER PUBLICATIONS

B.S. Manjunath et al., "Texture Features for Browsing and Retrieval of Image Data," IEEE Transactions on Pattern Analysis and Machine Intelligence, vol. 18, No. 8, pp. 837–842, 1996.

George M. Haley et al., "Rotation–Invariant Texture Classification Using a Complete Space–Frequency Model," IEEE Transactions Image Processing, vol. 8, No. 2, pp. 255–269, 1999.

* cited by examiner

*Primary Examiner*—Matthew C. Bella
*Assistant Examiner*—Anthony Blackman
(74) *Attorney, Agent, or Firm*—Seed IP Law Group PLLC (57) ABSTRACT

A texture description method in frequency domains and a texture-based retrieval method using the same, in which image signals are converted into those in a frequency domain of a Polar coordinate system. The texture description method in the frequency domain includes a first step of generating a frequency layout by partitioning the frequency domain into a set of feature channels; a second step of extracting the texture feature values of the image from the respective feature channels; and a third step of constituting a texture descriptor of the image in a vector form using the texture feature values extracted from the respective feature channels of the frequency layout. In a texture-based retrieval described in the frequency domain, a retrieval method capable of satisfying respective or all the retrieval conditions such as scale-, rotation- and intensity-invariant retrieval of relevant texture images is provided. Also, a retrieval method of computing the rough scheme of texture to provide a browsing functionality in retrieving is provided.

29 Claims, 3 Drawing Sheets

SIGNOGRAM

FIRST FOURIER TRANSFORM ↔

FIG. 2B

FOURIER TRANSFORM

EXTRACTING TEXTURE FEATURE VALUES OF AN IMAGE AS TEXTURE DESCRIPTOR IN A TEXTURE DESCRIPTION METHOD AND A TEXTURE-BASED RETRIEVAL METHOD IN FREQUENCY DOMAIN

TECHNICAL FIELD

The present invention relates to a texture description method for an image, and more particularly, to a method of describing image texture in the frequency domain, in which image signals are converted into those in a frequency domain of the Polar coordinate system to extract texture features. The present invention also relates to a method of texture-based retrieval of images indexed by the texture description method.

BACKGROUND OF THE INVENTION

The texture information of an image is one of the most important visual characteristics of the image and thus, has been studied together with the color information for a substantial period of time. This texture information of the image is usually used as an important low-level visual descriptor in content-based indexing and in abstracting an image or video data. Also, image texture is very important information used for retrieval of a special picture in an electronic album or content-based retrieval in tiles or textiles database.

Until now, feature values have generally been computed in the time domain or in the frequency domain to extract a texture feature of the image. More particularly, the method of extracting the texture features in the frequency domain was known to be suitable for describing image texture information of various types. Extracting texture features in the frequency domain can be done in the Cartesian or the Polar coordinate system.

Conventionally, the Cartesian coordinate system has been widely used in extracting a texture feature in the frequency domain.

A paper entitled "Texture Features For Browsing And Retrieval Of Image Data", written by B. S. Manjunath and W. Y. Ma is published in "IEEE Transaction on Pattern Analysis and Machine Intelligence", vol.18, no.8, in August of 1996, addresses a method of dividing the frequency domain of the Cartesian coordinate system based on HVS (Human Visual System) filtering of an image in the respective channels by Gabor filters, and then extracting the average and the standard deviation from the respective channels as texture features of the image.

However, the method of describing image texture is not suitable in the frequency domain of the Cartesian coordinate system for the HVS and leads to poor performance in relevant texture images.

To solve the problem of the image texture description method in frequency domain of the Cartesian coordinate system, a paper on image texture description method in frequency domain of the Polar coordinate system was published, in which the texture information in the frequency domain is computed in the Cartesian coordinate system.

In the paper entitled "Rotation-invariant Texture Classification using a complete Space Frequency Model", written by B. S. Manjunath and Geoge M. Haley and published in "IEEE Transaction on Pattern Analysis and Machine Intelligence", vol. 8, no.2, in February of 1999, a method of dividing a frequency space of the Polar coordinate system based on HVS (Hunan Visual System), then extracting 9 feature values using a Gabor filter designed to be suitable for respective channels, and describing the image texture using the extracted feature values of all channels was disclosed.

However, in this method, the same design of a set of Gabor filters is used for extracting different kinds of texture features in the frequency domain.

SUMMARY OF THE INVENTION

The disclosed embodiments of the present invention provide a texture description method in a frequency domain, suitable for HVS, in which image texture features are computed and indexed in a frequency domain.

In accordance with a further embodiment of the present invention, a texture-based retrieval method by using texture features computed in the frequency domain of the Polar coordinate system is provided, in which similar images in different variations, such as different rotations or scales or pixel intensity, are retrieved by comparing a query texture descriptor with a data texture descriptor generated by the texture description method and taking into account such variations thereof.

Also provided is a texture description method in the frequency domain of the Polar coordinate system that includes a first step of generating a frequency layout by partitioning said frequency domain into a set of feature channels; a second step of extracting texture feature values of said image from said respective feature channels; and a third step of constituting a texture descriptor in a vector form by using said texture feature values extracted from said respective feature channels in said frequency layout.

It is preferable that said first step is of generating said frequency layout on the basis of the HVS (Human Visual System), and that said frequency domain in said first step is that of the Cartesian coordinate system or the Polar coordinate system.

It is also preferable that said first step includes a sub-step of generating different frequency layouts for different types of texture features, that is, each texture feature type for its respective frequency layout.

It is further preferable that said first step comprises a sub-step of assigning significance or priority to the respective channels.

Also, it is preferable that said second step include a first sub-step of Radon-transforming said image; a second sub-step of Fourier-transforming said Radon-transformed image; and a third sub-step of extracting said texture feature values of said Fourier-transformed image from said respective feature channels.

It is further preferable that said third sub-step is of extracting at least energy deviation values and/or energy values in said respective feature channels.

Here, it is preferable that a frequency layout for obtaining said energy values and a frequency layout for obtaining said energy deviation value is separately prepared for extracting different types of an image texture, and that said frequency layout for obtaining said energy values partitions said frequency domain at intervals of $2^l(0 \leq l < \log_2(N/2)-1)$ octave in a radial direction and at intervals of '180/dividing resolution' in an angular direction. The frequency layout for obtaining said energy deviation values partitions said frequency domain at the same intervals in a radial direction and at intervals of '180/dividing resolution' in an angular direction.

It is preferable that said third step is of finding out a rotational reference axis of said image by using said image texture information, rotating said frequency layout with reference to said rotational reference axis, and then extracting said image texture descriptor of said image. Here, the rotational reference axis is set to be an axis in a radial direction, in which one of energy, entropy, and a periodical component is most distributed by Radon-transforming said image.

Preferably, the third step is of Fourier-transforming said image to find out a radial reference point, normalizing said Fourier-transformed image with reference to said reference point, and then describing said texture descriptor by using said normalized values of said Fourier-transformed image. Here, the radial reference point is set by determining an arc in which one of energy, entropy, and a periodical component of said Fourier-transformed image apart at the same distance from the origin in said frequency domain is most distributed, and then setting a radius of said founded arc as said radial reference point.

It is preferable that the method of describing image texture in a frequency domain according to the present invention further comprise a fourth step of extracting intensity information of said image to add said intensity information to said texture descriptor.

Also, according to the present invention, a computer readable recording media recording a program for realizing a texture description method in a frequency domain is provided. The program performs a first step of generating a frequency layout by partitioning said frequency domain into a set of feature channels; a second step of extracting texture feature values of said image by Radon-transforming said image in said respective feature channels, Fourier transforming said Radon-transformed image, and extracting texture feature values of said Fourier-transformed image from respective feature channels; and a third step of constituting a texture descriptor of said image in vector form by using said texture feature values extracted from said respective feature channels.

Also, according to the present invention, a method of populating a database with texture descriptors of images is provided. The method includes a first step of generating a frequency layout by partitioning the frequency domain into a set of feature channels; a second step of extracting texture feature values of said images in said respective feature channels; a third step of constituting texture descriptors of said images in vector forms by using said texture feature values extracted in said respective feature channels of said frequency layout; and a fourth step of indexing said respective texture descriptors of said images into said database. The first step comprises a first sub-step of generating the respective frequency layouts for texture feature types by partitioning the frequency domain into the respective sets of feature channels; and a second sub-step of extracting said texture feature values of each type for said images in said feature channels of said respective frequency layouts.

It is preferable that said second sub step include a first step of extracting energy values of a texture feature type for said images in said feature channels of the corresponding frequency layout for said energy feature type; and a second step of extracting energy deviation values of a texture feature type for said images in said feature channels of the corresponding frequency layout for said energy deviation feature type.

Also, it is preferable that said third step include a first sub-step of constituting texture descriptors of said images with said energy values and energy deviation values in a vector form; and a second sub-step of adding the mean and standard deviation values of said images into each of said texture descriptors of said images.

More preferably, the second step includes extracting energy values and energy deviation values as texture features for said images in said feature channels of said frequency layout.

Still more preferably, the first sub-step includes a step of generating, based on the HVS, more than one frequency layout for which each frequency layout is used for extracting feature values of each feature type; and a step of assigning significance or priority to respective channels of said frequency layouts.

Also, it is preferable that the second sub-step include a step of Radon-transforming the inputted images; a step of Fourier-transforming said Radon-transformed image; and a step of extracting feature values from said Fourier-transformed image in said respective feature channels of said frequency layout. The step of extracting feature values from said Fourier-transformed image is of extracting at least energy values or energy deviation values from said respective feature channels of said frequency layout.

Also, a method of retrieving relevant texture images in a database similar to a query image according to the present invention is provided. The method includes a first step of generating a frequency layout by partitioning frequency domain into a set of feature channels for feature extraction of an input query image; a second step of extracting a query texture descriptor of said query image when said query image is inputted; a third step of reading a texture descriptor from said database; a fourth step of measuring a distance between said texture descriptor of said input texture image and said texture descriptor read from said database; a fifth step of measuring distances for said texture descriptor of said input image to all or at least parts of the texture descriptors in said database; and a sixth step of ordering the similarity for the said texture descriptor to said texture descriptors in said database using said measured distances.

It is preferable that when rotation-invariant matching of said image is considered, said fifth step include a first sub-step of measuring distances between a texture descriptor taken from said database and said query texture descriptor by shifting feature values of said query texture descriptor in angular directions into the corresponding positions where the shifted feature values are supposed to be extracted when said query image rotates; a second sub-step of measuring the distances between said texture descriptor of said input texture image to said texture descriptor stored in said database for all rotation angles; and a third sub-step of determining as said distance the minimum distance between aid texture descriptor of said input texture image and said texture descriptor stored in said database for all rotation angles.

Also, it is preferable that when scale-invariant matching of said image is considered, said fifth step include a first sub-step of forming at least one zoom-in image and/or zoom-out image from said query image and extracting said query texture descriptors of zoom-in and/or zoom-out images of said query image; a second sub-step of measuring the distances between said query texture descriptors of zoom-in and/or zoom-out query images and said data texture descriptor in said database; and a third sub-step of determining as the distance the minimum distance of said distances between said texture descriptor in said database and said texture descriptor of said query texture descriptors at different scale values. Here, it is preferable that said query texture descriptor and said texture descriptor in said database include a rotational reference axis, a radial reference point, and mean and stand deviation of texture image intensities, respectively.

It is further preferable that when rotation-invariant of said query texture descriptor is considered, said fifth step is of aligning said texture descriptor of said query image and said texture descriptor in said database with reference to given rotation angles.

Also, it is preferable that said rotational reference axes are set to be radial axes in which one of an energy, an entropy, and a periodical component is most distributed in Fourier transform of said Radon-transformed images.

Preferably, when intensity-invariant matching of said query texture descriptor is considered, said fifth step is of excluding mean values from said query texture descriptor and said texture descriptor in said database and measuring a distance between said two texture descriptors.

More preferably, when scale-invariant matching of said query texture image is considered, said fifth step comprises a first sub-step of merging said feature values of the adjacent channels in radial directions for said two texture descriptors to be compared or shifting feature values of said two texture descriptors into radial directions according to a radial reference point; and a second sub-step of measuring a distance between said two texture descriptors with feature values merged in adjacent feature channels or with feature values shifted into adjacent feature channels.

Here, said radial reference point is preferably set by determining an arc in which energy or entropy or periodical components of said Fourier-transformed image apart at the same distance from the origin in said frequency domain are most distributed and setting a radius of said determined arc as said radial reference point.

When scale-invariant and rotation-invariant matching is considered simultaneously, said fifth step includes a first sub-step of merging said feature values of the adjacent channels in radial directions for said two texture descriptors to be compared or shifting feature values of said two texture descriptors into radial directions with reference to a radial reference point; a second sub-step of shifting feature values of said two texture descriptors in angular directions into the corresponding positions where the shifted feature values are supposed to extracted with reference to a rotation point; and a third sub-step of measuring a distance between said two texture descriptors with feature values of adjacent feature channels merged in radial directions and then shifted in angular directions.

A computer readable recording media recording a program retrieving a data image similar to any query image in a computer according to the present invention is provided. The program performs the following steps: a first step of generating a frequency layout by partitioning the frequency domain into a set of feature channels; a second step of, when images to be stored in a database is given, extracting texture feature values of said data image in said respective feature channels, and then extracting and storing a data texture descriptor of said data image by using said extracted texture feature values; a third step of, when said query image is inputted, extracting texture feature values of said query image in said respective feature channels, and extracting a query texture descriptor of said query image by using said extracted texture feature values; a fourth step of matching said data texture descriptor with said query texture descriptor and measuring a distance between two texture descriptors; and a fifth step of determining a similarity between said two images by means of said distance between said two texture descriptors.

Also, a texture-based retrieval method of a data image similar to a query image in a frequency domain according to the present invention is provided. The method includes a first step of extracting and storing a texture descriptor including texture feature values and the rotation information of images to be stored in a database; a second step of extracting a query texture descriptor including texture feature values and the rotation information of said query image when said query image is inputted; a third step of aligning the rotating angle between said data texture descriptor and said query texture descriptor according to said rotation information of said two texture descriptors; a fourth step of matching said two texture descriptors and measuring a distance between said two texture descriptors with rotation angles aligned between said two texture descriptors; and a fifth step of determining a similarity between said two images by means of said distance between said two texture descriptors.

It is preferable that said step of extracting said texture descriptor in said first and second steps include a first sub-step of generating a frequency layout by partitioning the frequency domain into a set of feature channels so as to extract respective feature value; a second sub-step of extracting texture feature values of said images in said respective divided frequency domains; and a third sub-step of constituting a texture descriptor of said image in a vector form by using said feature values extracted in said respective frequency channels of said frequency layout.

It is more preferable that said step of extracting said rotation information of said images in said first and second steps include a first sub-step of finding out a direction in which energy is much distributed in the Fourier transform of said inputted image; a second sub-step of generating a frequency layout by using said direction as a reference axis; and a third sub-step of adding said rotation information of said frequency layout to said texture descriptor of said image.

It is still more preferable that said first sub-step in said step of extracting said texture descriptor includes a step of generating at least one frequency layout in consideration of HVS; and a step of giving significance or priority to respective feature channels of said frequency layouts.

Preferably, said second sub-step in said step of extracting said texture descriptor includes a step of Radon-transforming said inputted image; a step of Fourier-transforming said Radon-transformed image; and a step of extracting said texture feature values from said Fourier-transformed image with respect to said respective frequency layout, and it is preferable that the step of extracting texture feature values from said Fourier-transformed image is of extracting at least energy values or energy deviation values in said respective feature channels.

A computer readable recording media recording a program retrieving a data image similar to a query image in a computer according to the present invention is provided. The program performs a first step of generating a frequency layout by partitioning a frequency domain into a set of feature channels; a second step of generating and storing a data texture descriptor by extracting texture feature values and the rotation information of said data image from said respective feature channels when an image to be stored in a database is given; a third step of generating a query texture descriptor by extracting texture feature values and the rotation information of said query image from said respective feature channels when said query image is inputted; a fourth step of aligning the rotating angles between said two data texture descriptors by using said rotation information of said data texture descriptor and said rotation information of said query texture descriptor; a fifth step of matching said two texture descriptors and measuring a distance between said two texture descriptors with said rotating angles aligned between said two texture descriptors; and a sixth step of determining a similarity between said two images by means of said distance between said two texture descriptors.

BRIEF DESCRIPTION OF THE DRAWINGS

The embodiments of the present invention will be explained with reference to the accompanying drawings, in which.

DETAILED DESCRIPTION OF THE INVENTION

The above features and advantages of the present invention will be better understood from the following description taken in conjunction with the attached drawings.

Figure 1:
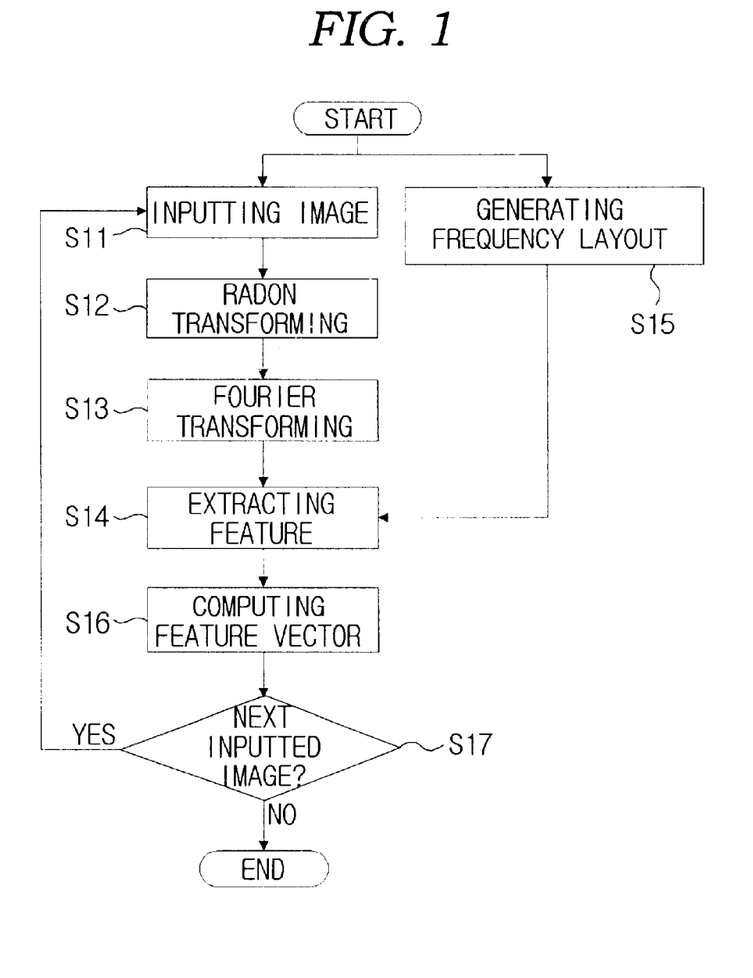
FIG. 1 is a flow chart for illustrating a texture description method in a frequency domain according to an embodiment of the present invention.

FIG. 1 shows a flow chart for illustrating a texture description method in a frequency domain according to the present invention, using Radon transformation.

The texture description method is used both in texture information-based indexing of the image and in texture information-based retrieval of the image, in which the input image is processed to prepare a texture descriptor. When images to be stored in a database are given, the corresponding data texture descriptors are generated and the generated texture descriptors are stored in the database. Also, when a query image is inputted, a query texture descriptor is generated and compared with the data texture descriptors stored in the database to perform retrieval.

With reference to FIG. 1, the texture description method according to the present invention will be described as follows.

First, when any image is inputted (S11), the inputted image is Radon-transformed at step S12. Here, Radon-transformation means a serial procedure of performing a line integral of 2-dimensional (2-D) image or multi-dimensional multimedia data along a light axis to obtain 1-dimensional projection data. That is, an object appears different according to viewing angles, and when viewing the object from all angles, profiles of the object can be guessed. The Radon transformation uses this principle.

The Radon transformation equation of the 2-dimensional image is expressed as follows.

$$p_\theta(R) = \int_{L(R,\theta)} f(x, y) dl = \int_{-\infty}^{\infty} \int_{-\infty}^{\infty} f(x, y) \delta(x\cos\theta + y\sin\theta - s) dx dy \qquad \text{EQ. 1}$$

Here, $f(x,y)$ is an image in the Cartesian coordinate system, and $p_\theta(R)$ is an 1-D projection obtained by the line integration of the image along a light axis of which the angle with respect to a positive x- axis is θ and which passes through the origin in the Cartesian coordinate system. That is, $p_\theta(R)$ is an 1-D projection of the image by Radon transformation.

A function $\delta(x)$ is a function which becomes 1 when x value is 0. The 2-dimensional image has the range of '−∞<x,y<∞' in the Cartesian coordinate system and a range of '0<s<∞, 0<θ<π' in a Radon coordinate system. That is, when xcos θ+ysin θ is s, δ(xcos θ+ysin θ−s) becomes 1.

A set of the first Radon transform functions $p_\theta(R)$ is referred to as Signogram, and in next step S13, the Signogram is Fourier transformed. As a result of Fourier transforming the Signogram, relationships between the Fourier transform of the Signogram and the Fourier transform of the image in the Cartesian coordinate system is expressed as set forth in Equation 2 below.

$$G_\theta(\lambda) = F(\lambda \cos\theta, \lambda \sin\theta) = F(\omega_x, \omega_y)|_{\omega_x = \lambda \cos\theta, \omega_y = \lambda \sin\theta} \qquad \text{EQ. 2}$$

Here, $G_\theta(\lambda)$ is a function to which $p_\theta(R)$ is Fourier transformed. And $\lambda$ is $\sqrt{\omega_x^2+\omega_y^2}$ and θ is $\tan^{-1}(\omega_y/\omega_x)$.

Figure 2A:
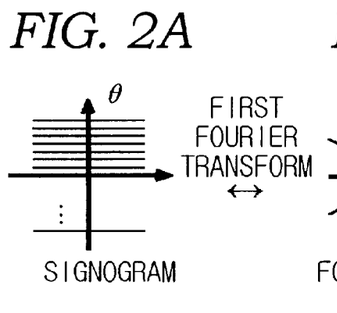
FIGS. 2A and 2B are drawings illustrating the general Central Slice theorem.
Figure 2B:
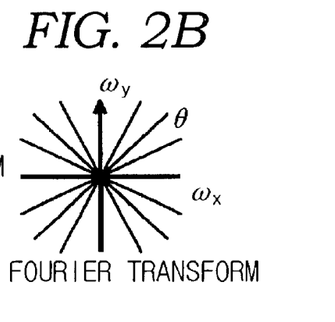

FIG. 2 shows a Central Slice theorem and is a drawing illustrating a relationship between the Signogram and a 1-dimensional Fourier transform of the Signogram. The Fourier transform of the Signogram is a function value taken by cutting the Fourier transform function of the 2-dimensional image along the θ-axis.

Figure 3:
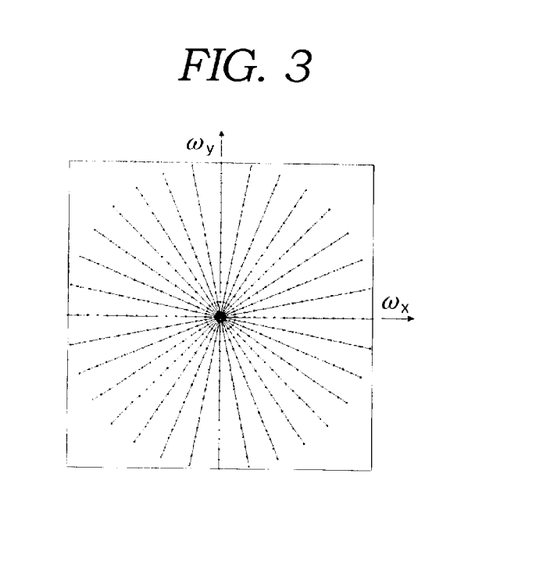
FIG. 3 is a drawing for illustrating a frequency sampling structure in the frequency domain using Radon transformation.

That is, the image function is Fourier-transformed after Radon transforming it, as shown in FIG. 2(B), the resulting Fourier transform of the image is represented in the Polar coordinate system, and frequency sampling in the Polar coordinate system is shown in FIG. 3.

Thus, FIG. 3 is a drawing illustrating a frequency sampling structure in the frequency domain using Radon transformation. The Fourier transform using the Radon transform converts the image signal into the frequency domain in the Polar coordinate system. This frequency sampling is described such that the density of the frequency sampling is high in low frequency regions and becomes lower from low to high frequency regions.

This sampling structure is well suited for the characteristics that information of general image texture is gathered in the low-to-mid frequency region, and features extracted from this frequency sampling structure represent well the characteristics of image texture.

Next, in step S14, the image texture features are extracted in the frequency domain of the Polar coordinate system having a frequency sampling structure as shown in FIG. 3. At that time, a frequency layout of the Polar coordinate system generated in step S15 is used. The respective partitioned frequency domains are referred to as a feature channel.

The frequency layout is a partition of the frequency domain on the basis of the HVS (Human Visual System). That is, the HVS is shown to be insensitive to the high frequency components and sensitive to the low frequency components of images and the frequency layout is designed by using such characteristics. The details thereof will be described later.

The present invention employs respective frequency layouts, that is, energy values and energy deviation values of Fourier transform of the image in respective channels, as an image texture feature. For this reason, a frequency layout of the Polar coordinate system for extracting the energy values and a frequency layout of the Polar coordinate system for extracting the energy deviation values are separately generated.

Figure 4:
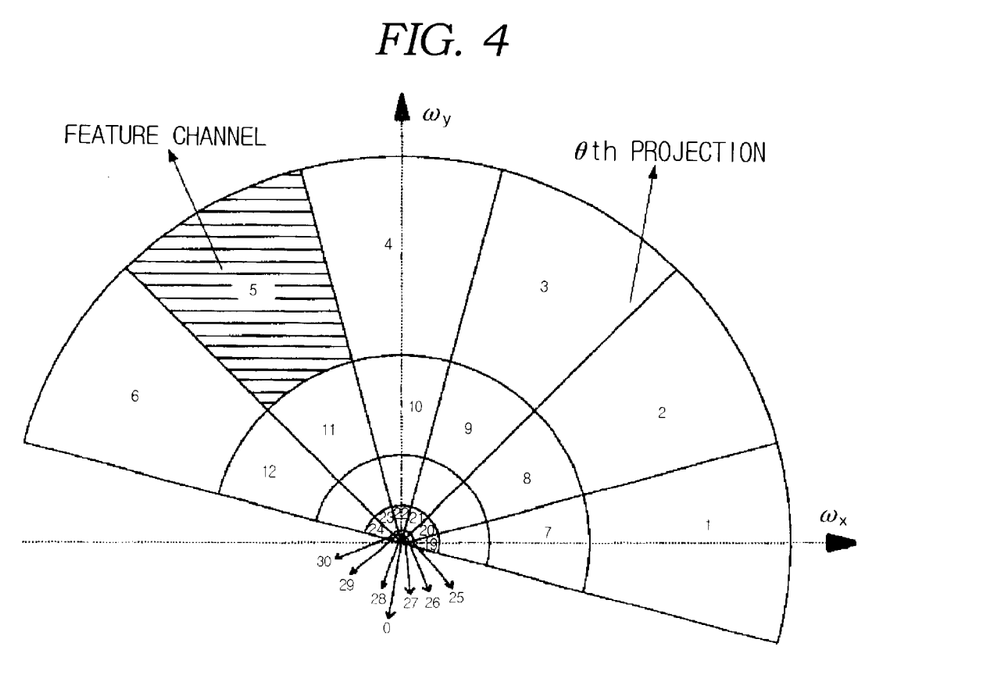
FIG. 4 is a drawing for showing a frequency layout used to extracting average values in respective frequency channels in the present invention.

FIG. 4 is a drawing showing a frequency layout of the Polar coordinate system used to extracting the energy values of respective channels on the basis of HVS.

As shown in FIG. 4, the frequency domain of the Polar coordinate system is partitioned in a radial direction and in an angular direction. The frequency domain is partitioned at intervals of $2^l (0 \leq l < \log_2(N/2)-1)$ octave in the radial direction and $\theta$ is partitioned at intervals of '180/dividing resolution' in the angular direction. By this partition, a frequency layout of the Polar coordinate system for extracting the energy values is dense at low frequency regions and sparse at high frequency regions. The respective partitioned frequency regions indicate feature channels and the slashed part is a 5-th channel.

From the above description, a primary characteristic of the present invention is known, in which the sampling density at low frequency region is high and the sampling density at high frequency region is low due to the Radon transform. When partitioning the frequency domain on the basis of HVS, the low frequency region is partitioned densely and the high frequency region is partitioned sparsely. That is, the feature values extracted from the respective partitioned frequency regions, that is, the respective channels, reflect well the global texture features all together.

Figure 5:
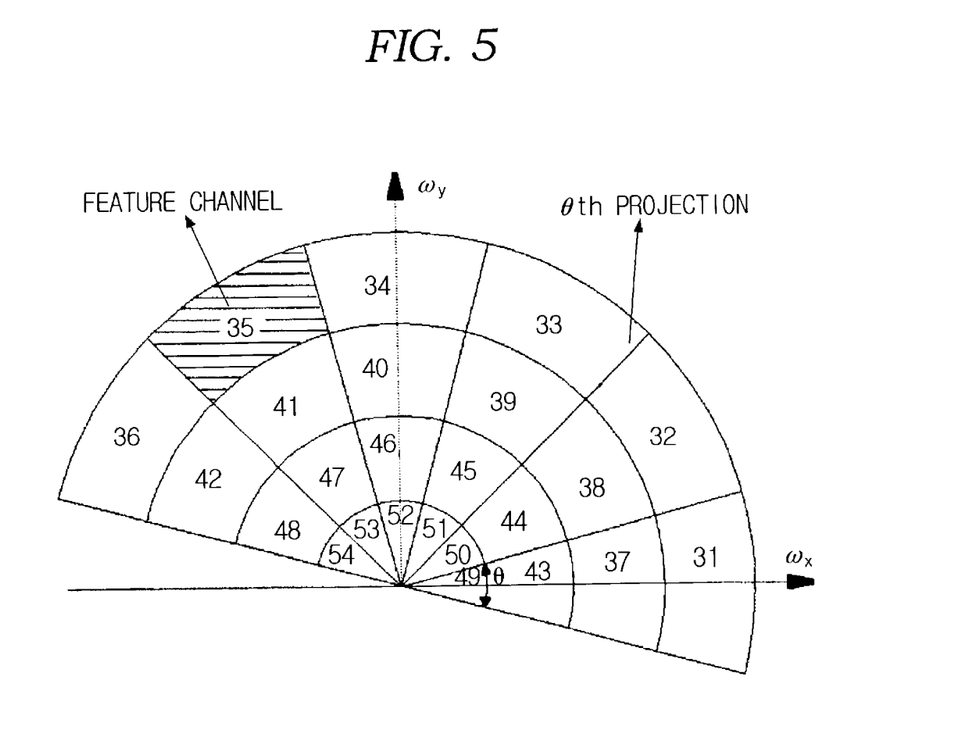
FIG. 5 is a drawing showing a frequency layout used to extract energy deviation values in respective frequency channels in the present invention.

FIG. 5 is a drawing showing a frequency layout used to extract energy deviation values on the basis of HVS.

Unlike the frequency layout of the Polar coordinate system for extracting the energy values, the frequency layout of the Polar coordinate system for extracting the energy deviation values uniformly partitions the frequency domain in a radial direction. However, $\theta$ is partitioned by 180/P (here, P is a dividing resolution of $\theta$) in the angular direction as in the frequency layout of FIG. 4. The respective partitioned frequency regions constitute feature channels, and the 35th channel is slashed.

In the present invention, the respective frequency layouts are designed for means of the extracted feature values. This provides a flexibility, so that the optimal frequency layout is allowed to provide high retrieval rate of relevant texture images to the respective features.

When the energy values and the energy deviation values are obtained in the respective channels, the image texture descriptor describing the image texture from the feature values, that is, a feature vector, is computed in step S16.

The texture descriptor is expressed in Equation 3 below.

$$TD = \{e_0, e_1, \ldots, e_{P \cdot Q}, d_{P \cdot Q+1}, d_{P \cdot Q+2}, \ldots, d_{P \cdot Q+Q}\} \quad (EQ. 3)$$

Here, $e_i$ is the energy value of the i-th channel in the frequency layout shown in FIG. 4 and $d_j$ is the energy deviation value of the j-th channel in the frequency layout shown in FIG. 5. Specifically, $e_0$ represents the energy of a DC channel. P is the number of the frequency regions partitioned in the angular direction and Q is the number of the frequency regions partitioned in the radial direction, in the frequency domain of the Polar coordinate system.

The respective feature values of Equation 3 can be first described according to the priority of the channels, and the size of the texture descriptor decreases when excluding the feature values of the channels having low significance according to the significance of channels.

The energy value $e_i$ and the energy deviation value $d_j$ are obtained by means of Equation 5 and Equation 7, respectively, below. In Equation 4, $p_i$ is obtained by using $G_\theta(\lambda)$ which is the Fourier transform of $p_\theta(R)$, and in Equation 6, $q_j$ is obtained by using $G_\theta(\lambda)$ and $p_i$ obtained in Equation 4 below.

$$p_i = \sum_{\lambda_i} \sum_{\theta_i} C(\lambda_i, \theta_i) G_\theta^2(\lambda) \quad (EQ. 4)$$

$$e_i = \log(1 + p_i) \quad (EQ. 5)$$

$$q_j = \sqrt{\sum_{\lambda_j} \sum_{\theta_j} D_j(\lambda_i, \theta_i)[G_\theta^2(\lambda) - p_j]^2} \quad (EQ. 6)$$

$$d_j = \log(1 + q_j) \quad (EQ. 7)$$

As described above, a texture descriptor constituted with the energy values and the energy deviation values of respective feature channels is obtained.

With respect to all the inputted images, step S11 through step S16 are repeatedly performed and the respective data texture descriptors are stored in the database.

The data texture descriptors stored in the database are matched with the very texture descriptor obtained from the query image to be used for retrieval the image similar to the query image.

Hereinafter, the texture-based retrieval method in the Polar coordinate frequency domain will be described.

In order to retrieve the image similar to the query image, 3 elements are considered in the present invention. First, the intensity-invariant matching is considered. That is, there are two cases, the one that the images similar in texture are retrieved without considering the changes in intensity of image and with considering the intensity changes. Second, rotation-invariant matching is considered. That is, the retrieval in consideration of rotation of image and the retrieval without consideration of rotation of image is classified. Third, scale-invariant matching is considered. That is, the original image is zoomed in/zoomed out to be retrieved in cases of abridgement/enlargement of the image.

First, the intensity-invariant retrieval method of texture images is explained. The intensity of an image is represented by means of an energy value $e_0$ of the DC channel of the texture descriptor (TD) vector. That is, $e_0$ is large when the image is bright and indicates small values when the image is dark. Therefore, in the intensity-invariant retrieval, $e_0$ is excluded from TD vector of the data texture descriptor vector and then the TD vector is matched with the query texture descriptor during the similarity matching. However, when the retrieval is performed in consideration of intensity-invariant matching, the TD vector containing $e_0$ is matched with the query texture descriptor.

Next, a first embodiment of the retrieval method with invariability in rotation is explained. When the image is rotated with respect to the same image, the conventional texture-based retrieval method did not retrieve the image as the same image. However, in the present invention, by performing matching of the images with invariability in rotation of image, the retrieval may be performed without consideration of rotation. The rotation-invariant retrieval method is as follows. It is known that a rotated image in the time domain results in the rotated Fourier transform of the original image.

In a state that the data texture descriptors $TD_m$ are stored in the database, the query image is processed by means of the texture description method of FIG. 1 to obtain the query texture descriptor $TD_{query}$. Then, a similarity between any $TD_m$ and $TD_{query}$ is computed to measure the matching degree.

The similarity is in inverse proportion to $D_m$ obtained by means of Equation 8 below.

$$D_m = \text{distance}(TD_m, TD_{query}) \tag{EQ.8}$$

A distance between the data texture descriptor and the query texture descriptor is obtained by comparing the texture descriptor having energy and energy deviation values. As explained above, the result is that any image has been rotated and then Fourier transformed is equal to the result that the image has been Fourier transformed and then rotated in the frequency domain. When two images are compared while rotating them in the frequency domain, two similar images can be determined.

Therefore, in the present invention, in comparing the distance between two texture descriptors by comparing the texture descriptors, the matching is performed in consideration of the possibility of rotation. By that consideration, all the rotated similar images can be retrieved. The matching is represented in Equation 9 below.

$$D_m^{k\phi} = \text{distance}(TD_m|_{k\phi}, TD_{query}) \tag{EQ.9}$$

Here, $\phi$ is 180/P, and k is any integer between 1 and P. That is, Equation 9 is the equation for obtaining the distance between the rotated data texture descriptor and the query texture descriptor, with the data texture descriptor rotated by the angle $\phi$ in the frequency domain.

By applying the distances in respective rotational angle ranges obtained in Equation 9 to the following Equation 10, the minimum distance is determined.

$$D_m = \min(D_m^{k\phi})|_{k \in \{1, \ldots, P\}} \tag{EQ.10}$$

By comparing the data texture descriptor having the query texture descriptor with the data texture descriptor rotated by a minute angle and selecting the minimum distance between two texture descriptors as a distance between two texture descriptors, the similar image can be retrieved regardless of rotation of image. On the contrary, when the retrieval is performed without considering invariability in rotation of image, the similarity is retrieved by means of Equation 8.

In retrieval in consideration of invariability in rotation of the image, as described above, $e_0$ is contained in the texture descriptor vector when the intensity of the image is considered, and $e_0$ is excluded from the texture descriptor vector when the intensity of the image is not considered. Thereafter, texture-based retrieval in consideration of invariability in rotation is performed.

Now, a second embodiment of the retrieval method with invariability in rotation of image is explained. As described above, Fourier transformation of the rotated image is equal to the result of rotating the Fourier transform of the non-rotated image in the frequency domain. Therefore, in matching the texture descriptors, when the matching is performed in consideration of the possibility of rotation, all images having equal texture and being rotated can be retrieved. For this performance, in the first embodiment of the retrieval method with invariability in rotation, the method of matching the data texture descriptors with the query texture descriptor is provided, with the data texture descriptor rotated by a minute angle.

On the contrary, in the second embodiment of the present invention, a method of adding the rotation information to the texture descriptor is provided. That is, if the image is Radon transformed, a reference angular direction which is most periodical or in which energy is most distributed is known. The Polar coordinate frequency layout (transformed layout) is generated using the direction as a reference axis, and then the texture descriptor of FIG. 1 is computed. At that time, the transformed layout is rotated with respect to the Polar coordinate layout of FIG. 5, and the reference axis of the transformed layout and the reference axis of the original Polar coordinate frequency layout are added to the texture descriptor as rotation information.

When a retrieval is required and the query texture descriptor containing the rotation information is provide together with the database storing the data texture descriptors containing the rotation information, two texture descriptors are matched in the rotational angles by using the rotation information of the data texture descriptor and the rotation of the query texture descriptor.

That is, the reference angular directions of two images are matched, and in this state the distance between two images is obtained by comparing two texture descriptors. Unlike the first embodiment, the second embodiment has an advantage that similarity between two images can be obtained without the procedure of obtaining the distance between two texture descriptors by comparing the data texture descriptor with the query texture descriptor while the data texture descriptor is rotated. However, because the procedure of obtaining and adding the rotation information to the texture descriptor is added to the step of describing the texture, computing the texture descriptor becomes complex.

Here, the rotation information is represented using the Radon transform of the image, in which the reference direction is the direction in which energy is most periodic or in which energy is most distributed. However, a method of finding out the reference axis of rotational direction using the texture information of the image and describing the texture by matching the frequency layout with the reference axis, or a texture description method using the frequency layout without the reference axis may be employed, and the present invention is not limited to those methods.

Third, in the texture-based retrieval method of an embodiment according to the present invention, as described above, invariability in abridgement/enlargement of image is considered and is explained in detail herein.

When the image is obtained through a varying zoom of a camera, the obtained image is abridged or enlarged according to the zoom magnification of the camera. When such effect is analyzed in the frequency domain, the frequency spectrum distribution of an image enlarged from the original image shrinks toward the origin of the frequency domain than does the original spectrum. Also, the frequency spectrum distribution of an image abridged from the original image spreads out from the origin of the frequency domain than the original spectrum.

By Radon transformation of the image, a scale reference is determined with reference to the energy of the projection data. When the texture-based retrieval with invariability in abridgement/enlargement of image is performed with respect to such an image, by adding a feature value of the adjacent channel with reference to the scale reference in a radial direction to be overlapped by one channel, or by finding out a channel enlarged/abridged from the origin due to abridgement/enlargement, the similarity is computed as in Equation 11 below. The added channel is referred to as an merged channel or a matching channel and in a word, as a modified channel.

$$D_k = \text{distance}(\text{modified channel feature}_k^{texture}, \text{modified channel feature}_{unknown}^{texture}) \quad \text{(EQ.11)}$$

When the texture descriptor is obtained by finding out a reference point in the radial direction by using texture information from the image, normalizing Fourier transform of the image with reference to the reference point, and then extracting a feature value of the normalized Fourier transform, similarity retrieval can be performed using Equation 8.

Here, a radius of the determined arc as follows is set as the reference point in the radial direction. The arc is determined in which the energy or entropy or periodical component of the Fourier-transformed image apart at the same distance from the origin in the frequency domain is most distributed is determined.

Another embodiment of the retrieval method with invariability in abridgement/enlargement is described. By making one inputted image at least one enlarged image or at least one abridged image, the texture descriptor is represented by means of respective enlarged/abridged query images. Then, the texture descriptors of the respective enlarged/abridged query images are extracted and a distance to the data texture descriptor is measured by means of Equation 8 above. The minimum distance of the distances between the data descriptor and the data descriptors of the respective enlarged/abridged query image is determined as an original distance between the query texture descriptor and the data texture descriptor.

When the retrieval without invariability in abridgement/enlargement of the image is performed, the similarity is computed by means of Equation 8.

When the retrieval with both invariability in abridgement/enlargement and invariability in rotation is performed, in the retrieval with invariability in abridgement/enlargement of image, adjacent channels are merged and modified, and then feature values of the modified channels are retrieved invariantly in rotation. At that time, the similarity retrieval is performed by means of Equations 11, 9 and 10.

The texture descriptor TD vector expressed in Equation 3 enables the texture structure information to be inferred from the arranged pattern of feature values of the texture descriptor. This can support the functionality of roughly finding out a special structure of the texture to browse. In order to support the simple browsing, in the present invention, the simple structure information of texture is computed using feature values extracted from the energy channel as show in FIG. 4. Computing the texture structure is performed by obtaining entropy of feature values of 30 energy channels, or by computing the angular difference or radial difference between two maximum energies in the energy channel layout.

According to the above-described present invention, the image texture can be described more accurately and the effective indexing and retrieval is possible by using a method of partitioning the frequency domain in the Polar coordinate system, with a frequency layout in the Polar coordinate system suitable for extracting the respective feature values, a method of extracting feature values in respective frequency domains, assigning significance and priority to respective frequency channels, a texture indexing method supporting rotation-, scale-, intensity-invariant retrieval, a texture descriptor matching method, and the like.

The image texture descriptor extracted by means of the texture description method according to the present invention can be used as a useful searching clue in finding out an image having a special feature in an aerial photograph on a grand scale, a military radar image, and the like.

Although preferred embodiments of the present invention has been disclosed with reference to the appended drawings, descriptions in the present specification are only for illustrative purpose, not for limiting the present invention.

Also, those who are skilled in the art will appreciate that various modifications, additions and substitutions are possible without departing from the scope and spirit of the present invention. Therefore, it should be understood that the present invention is not limited only to the accompanying claims and the equivalents thereof, and includes the aforementioned modifications, additions and substitutions.

What is claimed is:

1. A method of describing an image texture information in a frequency domain, comprising the steps of:
   a first step of generating a frequency layout by partitioning said frequency domain into a set of feature channels;
   a second step of extracting texture feature values of said image from said respective feature channels, comprising extracting energy values and energy deviation values as the texture feature values for said image in said feature channels of said frequency layout; and
   a third step of generating a texture descriptor of said image in a vector form by using said texture feature values extracted from said respective feature channels in said frequency layout,
   wherein said frequency layout for obtaining said energy values partitions said frequency domain by an octave scale in a radial direction and with equal angles in an angular direction.

2. The method of describing the image texture information in a frequency domain according to claim 1, wherein said first step comprises a sub-step of assigning priority to respective feature channels.

3. The method of describing the image texture information in a frequency domain according to claim 1, wherein said second step comprises:
   a first sub-step of Radon transforming said image;
   a second sub-step of Fourier-transforming said Radon-transformed image; and
   a third sub-step of extracting said texture feature values of said Fourier-transformed image from said respective feature channels.

4. The method of describing the image texture information in a frequency domain according to claim 1, wherein a frequency layout for obtaining said energy values and a frequency layout for obtaining said energy deviation values is separately prepared for extracting different types of an image texture.

5. The method of describing the image texture information in a frequency domain according to claim 1, wherein a frequency layout for obtaining said energy values partitions said frequency domain by an octave scale, $2^l (0 \leq l < \log_2(N/2)-1)$ in a radial direction and with equal angles of '180/dividing resolution' degrees in an angular direction.

6. The method of describing the image texture information in a frequency domain according to claim 1, wherein a frequency layout for obtaining said energy deviation values partitions said frequency domain at the same intervals in a radial direction and with equal angles of '180/dividing resolution' degrees in an angular direction.

7. The method of describing the image texture information in a frequency domain according to claim 1, wherein said third step is of finding out a rotational reference axis of said image by using said image texture information, rotating said frequency layout with reference to said rotational reference axis, and then extracting said texture descriptor of said image.

8. The method of describing the image texture information in a frequency domain according to claim 1, wherein said third step comprises Fourier transforming said image to find out a radial reference point, normalizing said Fourier-transformed image with reference to said radial reference point, and then describing said texture descriptor by using normalized values of said Fourier-transformed image.

9. The method of describing the image texture information in a frequency domain according to claim 8, wherein said radial reference point is set by determining an arc in which one of an energy, an entropy, and a periodical component of said Fourier-transformed image apart at the same distance from the origin in said frequency domain is most distributed, and setting a radius of said determined arc as said radial reference point.

10. The method of describing the image texture information in a frequency domain according to claim 1, further comprising a fourth step of extracting intensity information of said image to add said intensity information to said texture descriptor.

11. A computer readable recording media recording a program describing a texture information of an image in a frequency domain, the program performing the steps of:
  a first step of generating a frequency layout by partitioning said frequency domain into a set of feature channels;
  a second step of extracting texture feature values of said image by Radon transforming said image in said respective feature channels, Fourier transforming said Radon-transformed image, and extracting feature values of said Fourier-transformed image from said respective feature channels, said second step comprising extracting energy values and energy deviation values as the texture features for said image in said feature channels of said frequency layout; and
  a third step of generating a texture descriptor of said image in a vector form by using said texture feature values extracted from said respective feature channels,
  wherein said frequency layout for obtaining said energy values partitions said frequency domain by an octave scale in a radial direction and with equal angles in an angular direction.

12. A method of populating a database with texture descriptors of images, comprising the steps of:
  a first step of generating a frequency layout by partitioning a frequency domain into a set of feature channels;
  a second step of extracting texture feature values of said images in said respective feature channels, comprising extracting energy values and energy deviation values as the texture features for said images in said feature channels of said frequency layout;
  a third step of constituting the texture descriptors of said images in vector forms by using said texture feature values extracted from said respective feature channels of said frequency layout; and
  a fourth step of indexing said respective texture descriptors of said images into said database,
  wherein said frequency layout for obtaining said energy values partitions said frequency domain by an octave scale in a radial direction and with equal angles in an angular direction.

13. A method of populating a database with texture descriptors of images, comprising the steps of:
  a first step of generating a frequency layout by partitioning a frequency domain into a set of feature channels;
  a second step of extracting texture feature values of said images in said respective feature channels, comprising extracting energy values and energy deviation values as the texture features for said images in said feature channels of said frequency layout;
  a third step of constituting the texture descriptors of said images in vector forms by using said texture feature values extracted from said respective feature channels of said frequency layout; and
  a fourth step of indexing said respective texture descriptors of said images into said database,
  wherein said first step comprises:
    generating the respective frequency layouts for texture feature types by partitioning the frequency domain into the respective sets of feature channels; and
  wherein said second step comprises:
    extracting energy values of a texture feature type for said images in said feature channels of the corresponding frequency layout for said energy feature type; and
    extracting energy deviation values of a texture feature type for said images in said feature channels of the corresponding frequency layout for said energy deviation feature type.

14. The method of populating a database with texture descriptors of images according to claim 13, wherein said third step comprises:
  a first sub-step of constituting texture descriptors of said images with said energy values and energy deviation values in a vector form; and
  a second sub-step of adding the mean and standard deviation values of said images into each of said texture descriptors of said images.

15. A method of retrieving relevant texture images in a database similar to a query image, comprising the steps of:
  a first step of generating a frequency layout by partitioning a frequency domain of the query image into a set of feature channels for feature extraction of the input query image;
  a second step of extracting a query texture descriptor of said query image, said query texture descriptor comprising energy values and energy deviation values of said feature channels;
  a third step of reading a data texture descriptor from said database;
  a fourth step of measuring distances for said query texture descriptor of said input query image to at least parts of the data texture descriptors in said database; and
  a fifth step of ordering similarities for the said query texture descriptor to said data texture descriptors in said database using said measured distances,
  wherein said frequency layout for obtaining said energy values partitions said frequency domain by an octave scale in a radial direction and with equal angles in an angular direction.

16. A method of retrieving relevant texture images in a database similar to a query image, comprising the steps of:
  a first step of generating a frequency layout by partitioning a frequency domain of the query image into a set of feature channels for feature extraction of the input query image;

a second step of extracting a query texture descriptor of said query image;

a third step of reading a data texture descriptor from said database;

a fourth step of measuring distances for said query texture descriptor of said input query image to at least parts of the data texture descriptors in said database; and a fifth step of ordering similarities for the said query texture descriptor to said data texture descriptors in said database using said measured distances wherein when rotation-invariant matching of said query image is considered, said fourth step comprises:

a first sub-step of measuring distance between a data texture descriptor taken from said database and said query texture descriptor by shifting feature values of said query texture descriptor in angular directions into the corresponding positions where the shifted feature values are supposed to be extracted when said query image rotates;

a second sub-step of measuring the distances between said texture descriptor of said input query image and said data texture descriptor stored in said database for all rotation angles; and    a third sub-step of determining as said distance the minimum distance between said query texture descriptor of said input query image and said data texture descriptor stored in said database for all rotation angles.

17. A method of retrieving relevant texture images in a database similar to a query image, comprising the steps of:

a first step of generating a frequency layout by partitioning a frequency domain of the query image into a set of feature chapels for feature extraction of the input query image;

a second step of extracting a query texture descriptor of said query image;

a third step of reading a data texture descriptor from said database;

a fourth step of measuring distances for said query texture descriptor of said input query image to at least parts of the data texture descriptors in said database; and a fifth step of ordering similarities for the said query texture descriptor to said data texture descriptors in said database using said measured distances, wherein when scale-invariant matching of said image is considered, said fourth step comprises:

a first sub-step of forming at least one zoom-in image and/or zoom-out image from said query image and extracting said query texture descriptors of zoom-in and/or zoom-out images of said query image;

a second sub-step of measuring the distances between said query texture descriptors of zoom-in and/or zoom-out query images and said data texture descriptor in said database; and    a third sub-step of determining as the distance the minimum distance of said distances between said data texture descriptor in said database and said query texture descriptors at different scale values.

18. A method of retrieving relevant texture images in a database similar to a query image, comprising the steps of:

a first step of generating a frequency layout by partitioning a frequency domain of the query image into a set of feature chancels for feature extraction of the input query image;

a second step of extracting a query texture descriptor of said query image;

a third step of reading a data texture descriptor from said database;

a fourth step of measuring distances for said query texture descriptor of said input query image to at least parts of the data texture descriptors in said database; and a fifth step of ordering similarities for the said query texture descriptor to said data texture descriptors in said database using said measured distances, wherein said query texture descriptor and said data texture descriptor in said database include a rotational reference axis, a radial reference point, and mean and stand deviation of texture image intensities, respectively.

19. A method of retrieving relevant texture images in a database similar to a query image, comprising the steps of:

a first step of generating a frequency layout by partitioning a frequency domain of the query image into a set of feature channels for feature extraction of the input query image;

a second step of extracting a query texture descriptor of said query image;

a third step of reading a data texture descriptor from said database;

a fourth step of measuring distances for said query texture descriptor of said input query image to at least parts of the data texture descriptors in said database; and a fifth step of ordering similarities for the said query texture descriptor to said data texture descriptors in said database using said measured distances, wherein when rotation-invariant of said query texture descriptor is considered, said fourth step comprises aligning said query texture descriptor of said query image and said data texture descriptor in said database with reference to given rotation angles.

20. A method of retrieving relevant texture images in a database similar to a query image, comprising the steps of:

a first step of generating a frequency layout by partitioning a frequency domain of the query image into a set of feature channels for feature extraction of the input query image;

a second step of extracting a query texture descriptor of said query image;

a third step of reading a data texture descriptor from said database;

a fourth step of measuring distances for said query texture descriptor of said input query image to at least parts of the data texture descriptors in said database; and a fifth step of ordering similarities for the said query texture descriptor to said data texture descriptors in said database using said measured distances, wherein when intensity-invariant matching of said query texture descriptor is considered, said fourth step comprises excluding mean values from said query texture descriptor and said data texture descriptor in said database and measuring a distance between said query texture descriptor and said data texture descriptor.

21. A method of retrieving relevant texture images in a database similar to a query image, comprising the steps of:

a first step of generating a frequency layout by partitioning a frequency domain of the query image into a set of feature channels for feature extraction of the input query image;

a second step of extracting a query texture descriptor of said query image;

a third step of reading a data texture descriptor from said database;

a fourth step of measuring distances for said query texture descriptor of said input query image to at least parts of the data texture descriptors in said database; and a fifth step of ordering similarities for the said query texture descriptor to said data texture descriptors in said database using said measured distances, wherein when scale-invariant matching of said query texture image is considered, said fourth step comprises:

a first sub-step of merging said feature values of the adjacent channels in radial directions for said query texture descriptor and said data texture descriptor to be compared or shifting feature values of said query texture descriptor and said data texture descriptor into radial directions according to a radial reference point; and a second sub-step of measuring a distance between said query texture descriptor and said data texture descriptor with feature values merged in adjacent feature channels or with feature values shifted into adjacent feature channels.

22. A computer readable recording media recording a program retrieving a data image similar to any query image in a computer, the program performing the steps of:

a first step of generating a frequency layout by partitioning the frequency domain into a set of feature channels;

a second step of, when images to be stored in a database is given, extracting texture feature values of said data image in said respective feature channels, and then extracting and storing a data texture descriptor of said data image by using said extracted texture feature values, said data texture descriptor comprising energy values and energy deviation values of said texture feature channels of said data image;

a third step of, when said query image is inputted, extracting texture feature values of said query image in said respective feature channels, and extracting a query texture descriptor of said query image by using said extracted texture feature values;

a fourth step of matching said data texture descriptor with said query texture descriptor and measuring a distance between said data texture descriptor and said query texture descriptor; and a fifth step of determining a similarity between said data image and said query image by means of said distance, wherein said frequency layout for obtaining said energy values partitions said frequency domain by an octave scale in a radial direction and with equal angles in an angular direction.

23. A texture-based retrieval method of a data image similar to a query image in a frequency domain, comprising the steps of:

a first step of extracting and storing a data texture descriptor including texture feature values comprising energy values and energy deviation values and the rotation information of data images to be stored in a database;

a second step of extracting a query texture descriptor including texture feature values and the rotation information of said query image when said query image is inputted;

a third step of aligning the rotating angle between said data texture descriptor and said query texture descriptor according to said rotation information of said data texture descriptor and said query texture descriptor;

a fourth step of matching said data texture descriptor with said query texture descriptor and measuring a distance between said data texture descriptor and said query texture descriptor with rotation angles aligned between said data texture descriptor and said query texture descriptor; and a fifth step of determining a similarity between said data image and said query image by means of said distance, wherein a frequency layout for obtaining said energy values partitions said frequency domain by an octave scale in a radial direction and with equal angles in an angular direction.

24. The texture-based retrieval method of a data image similar to a query image in a frequency domain according to claim 23, wherein said step of extracting said texture descriptor in said first and second steps comprises:

a first sub-step of generating a frequency layout by partitioning the frequency domain into a set of feature channels so as to extract respective feature value;

a second sub-step of extracting texture feature values of said images in said respective divided frequency domains; and a third sub-step of generating a texture descriptor of said image in a vector form by using said feature, values extracted in said respective frequency channels of said frequency layout.

25. The texture-based retrieval method of a data image similar to a query image in a frequency domain according to claim 24, wherein said step of extracting said rotation information of said images in said first and second steps comprises:

a first sub-step of finding out a direction in which energy is much distributed in the Fourier transform of said inputted image;

a second sub-step of generating a frequency layout by using said direction as a reference axis; and a third sub-step of adding said rotation information of said frequency layout to said texture descriptor of said image.

26. The texture-based retrieval method of a data image similar to a query image in a frequency domain according to claim 24, wherein said first sub-step in said step of extracting said texture descriptor comprises:

generating at least one frequency layout in consideration of HVS; and assigning priority to respective feature channels of said frequency layouts.

27. The texture-based retrieval method of a data image similar to a query image in a frequency domain according to claim 24, wherein said second sub-step in said step of extracting said texture descriptor comprises:

Radon-transforming said inputted image;

Fourier-transforming said Radon-transformed image; and extracting said texture feature values from said Fourier-transformed image with respect to said respective frequency layout.

28. A computer readable recording media recording a program retrieving a data image similar to a query image in a computer, the program performing steps of:

a first step of generating a frequency layout by partitioning a frequency domain into a set of feature channels;

a second step of generating and storing a data texture descriptor by extracting texture feature values comprising energy values and energy deviation values of said feature channels and rotation information of said data image from said respective feature channels when an image to be stored in a database is given;

a third step of generating a query texture descriptor by extracting texture feature values and the rotation information of said query image from said respective feature channels when said query image is inputted;

a fourth step of aligning the rotating angles between said data texture descriptor and said query texture descriptor by using said rotation information of said data texture descriptor and said rotation information of said query texture descriptor;

a fifth step of matching said data texture descriptor with said query texture descriptor and measuring a distance between said data texture descriptor and said query texture descriptor with said rotating angles aligned between data texture descriptor and said query texture descriptor; and a sixth step of determining a similarity between said data image and said query image by means of said distance, wherein said frequency layout for obtaining said enter values partitions said frequency domain by an octave scale in a radial direction and with equal angles in an angular direction.

29. The method of describing the image texture information in a frequency domain according to claim 1, wherein said energy value is defined as the log scaled sum of the Fourier-transform of the image, and wherein said energy deviation value is defined as the log-scaled standard deviation of the square of the Fourier-transform of the image.

* * * * *

UNITED STATES PATENT AND TRADEMARK OFFICE
CERTIFICATE OF CORRECTION

PATENT NO. : 6,803,919 B1
DATED : October 12, 2004
INVENTOR(S) : Munchurl Kim et al.

It is certified that error appears in the above-identified patent and that said Letters Patent is hereby corrected as shown below:

Column 17,
Line 34, "chapels" should read as -- channels --.
Line 64, "chancels" should read as -- channels --.

Signed and Sealed this

Thirtieth Day of August, 2005

JON W. DUDAS
*Director of the United States Patent and Trademark Office*